US008996327B2

(12) United States Patent
Ge et al.

(10) Patent No.: US 8,996,327 B2
(45) Date of Patent: Mar. 31, 2015

(54) ENHANCING THERMOCOUPLE TEMPERATURE MEASUREMENT ACCURACY WITH LOCAL RTDS TO COMPENSATE TERMINAL TEMPERATURE DIFFERENCE

(75) Inventors: Liang Ge, Singapore (SG); Xiaofan Chen, Singapore (SG)

(73) Assignee: Rockwell Automation Asia Pacific Business Ctr. Pte. Ltd., Singapore (SG)

( * ) Notice: Subject to any disclaimer, the term of this patent is extended or adjusted under 35 U.S.C. 154(b) by 584 days.

(21) Appl. No.: 13/348,527

(22) Filed: Jan. 11, 2012

(65) Prior Publication Data
US 2012/0179407 A1 Jul. 12, 2012

(30) Foreign Application Priority Data

Jan. 12, 2011 (SG) ................................ 201100201-1

(51) Int. Cl.
| G01K 7/13 | (2006.01) |
| G01K 7/16 | (2006.01) |
| G01K 7/00 | (2006.01) |
| G01K 1/20 | (2006.01) |
| G01K 7/02 | (2006.01) |
| G01K 7/12 | (2006.01) |

(52) U.S. Cl.
CPC .. G01K 1/20 (2013.01); G01K 7/02 (2013.01); G01K 7/12 (2013.01)
USPC .............. 702/99; 702/133; 374/166; 374/179

(58) Field of Classification Search
None
See application file for complete search history.

(56) References Cited

U.S. PATENT DOCUMENTS

| 5,669,713 A | * | 9/1997 | Schwartz et al. ................. 374/1 |
| 6,321,588 B1 | * | 11/2001 | Bowers et al. ............... 73/24.01 |
| 2006/0067377 A1 | * | 3/2006 | Streicher ....................... 374/110 |
| 2008/0304547 A1 | * | 12/2008 | Ota ............................... 374/181 |

FOREIGN PATENT DOCUMENTS

JP 2004-037139 * 2/2004 ............... G01K 7/13

OTHER PUBLICATIONS

Flex I/O Thermocouple/RTD Input Analog Module—Installation Instructions, Cat. No. 1794-IRT8/B, 1794-IRT8K/B and 1794-IRT8XT/B, Publication 1794-IN050J-EN-P—Jan. 2009, pp. 1-6.—Admitted Prior Art.

* cited by examiner

Primary Examiner — Michael Nghiem
Assistant Examiner — Alexander Satanovsky
(74) Attorney, Agent, or Firm — Boyle Fredrickson, S.C.

(57) ABSTRACT

An I/O circuit for measuring temperatures uses multiple cold-junction compensation sensors permanently affixed near the terminals of the terminal block in order to compensate significant temperature variation across the terminals of the I/O module (up to 3° C.) that can substantially affect the accuracy of thermocouple measurements. The use of these multiple sensors is enabled by a compensation system that corrects for the distance between the built-in sensors and the terminals, a multiplexer that accommodates the additional signal burden produced by the sensors, and a compensation system that allows low-cost sensors to be used and calibrated to as little as a single high accuracy sensor. In one embodiment, a third temperature sensor with relatively higher accuracy is used to compensate for lower accuracy of permanently affixed sensors.

18 Claims, 4 Drawing Sheets

_US 8,996,327 B2_

ENHANCING THERMOCOUPLE TEMPERATURE MEASUREMENT ACCURACY WITH LOCAL RTDS TO COMPENSATE TERMINAL TEMPERATURE DIFFERENCE

CROSS REFERENCE TO RELATED APPLICATION

This application claims priority to Singapore Patent Application No. 201100201-1 filed on Jan. 12, 2011, the disclosure of which is expressly incorporated herein.

BACKGROUND OF THE INVENTION

The present invention relates to industrial control systems used for real-time control of industrial processes, and in particular to an input/output (I/O) module for connection to thermocouples to provide for temperature measurement.

Industrial control systems are special purpose computer systems used in controlling industrial processes. Under the direction of a stored control program, a programmable logic controller, being part of the industrial control system, reads inputs from one or more I/O modules and writes outputs one or more I/O modules. The inputs are derived from signals obtained from sensors associated with the industrial process and the output signals produce electrical signals to actuators and the like in the industrial process. The inputs and outputs may be binary, that is on or off or analog, providing a value with a continuous range for more complex I/O devices like motor controllers and the like.

One form of analog input I/O module receives an input from a thermocouple. As is understood in the art, thermocouples provide a voltage that is proportional to a difference in temperature between two junctions of dissimilar metals per the Seebeck effect. In order to determine a temperature at one junction ("hot junction"), the second junction ("cold junction") may be held at a standard and known temperature. For practical devices, however, this cold junction is not held at a particular temperature but rather its temperature is measured and used to provide for "cold junction compensation" in which to measure temperatures applied to empirically derived compensation tables that may be used to correct the value of the hot junction. These tables may also be used to correct for inherent nonlinearities in the voltage-to-temperature function of the thermocouple.

It is known to provide I/O modules for use with thermocouples with a cold junction compensation circuit providing a precision temperature measuring element, for example, a resistive thermal device (RTD) that may be attached to terminals near the terminals receiving signals from thermocouples to provide a measurement of the temperature in the vicinity of those terminals. This temperature measurement is used for the cold junction compensation by the I/O module through computations typically performed by a processor internal to the I/O module.

The cost of these precision temperature references is relatively high and they take up terminal space that could be used for other devices and accordingly a typical I/O module will use one or two cold junction compensation circuits at most.

SUMMARY OF THE INVENTION

The present inventors have determined that there can be a significant temperature variation across the terminals of the I/O module in use (up to 3° C.) that can substantially affect the accuracy of thermocouple measurements. The present invention addresses this problem by providing multiple built-in auxiliary temperature sensors positioned at a temperature sensing terminals. The use of these multiple sensors is enabled in various embodiments by a compensation system that corrects for the distance between the built-in sensors and the terminals, a multiplexer that accommodates the additional signal burden produced by the sensors, and a compensation system that allows low-cost sensors to be used and calibrated to as little as a single high accuracy sensor.

Specifically then the present invention provides an I/O circuit for use with an industrial control system including a terminal block having terminals for releasably receiving leads of at least one first temperature sensor and a multiplicity of second temperatures sensors permanently affixed in thermal communication with the terminals of the terminal block. Input circuitry electrically connects to the terminals and to the second temperature sensors for receiving temperature signals from the first temperature sensors and second temperature sensors, the input circuitry operating to compensate the received temperature signals from the first temperature sensors using temperature signals from the second temperature sensors.

It is thus a feature of at least one embodiment of the invention to provide a system that greatly reduces errors caused by unpredictable terminal-to-terminal temperature variation.

The terminal block may be attached to a printed circuit board and the multiplicity of second temperature sensors are soldered to the printed circuit board.

It is thus a feature of at least one embodiment of the invention to provide a simple method of incorporating multiple compensation sensors into a terminal block system.

A housing covering a portion of the terminal block and the multiplicity of second temperature sensors may be covered by at least one of the housing and terminal block.

It is thus a feature of at least one embodiment of the invention to provide high accuracy cold junction compensation which is invisible to the user and does not interfere with the use of the terminal block.

The I/O circuit may further include terminals for connecting at least one third temperature sensor having a higher accuracy than the multiplicity of second temperature sensors, and the input circuitry may also electrically connect to the terminals for connecting the third temperature sensor for receiving a temperature signal from the third temperature sensor, the input circuitry operating to compensate the multiplicity of second temperature sensors using the temperature signal from the third temperature sensor.

It is thus a feature of at least one embodiment of the invention to permit the use of commercially practical low-cost sensors to provide for the multiple temperature sensing points needed for terminal-to-terminal corrections.

The multiplicity of second temperature sensors are RTD sensors.

It is thus a feature of at least one embodiment of the invention to provide low-cost temperature sensors readily available in integrated circuit packages.

The I/O circuit may execute a stored program to use a thermal model to extend the temperature signals of the second temperature sensors to an estimated cold junction temperature at the terminals.

It is thus a feature of at least one embodiment of the invention to permit practical mounting of the cold junction compensation sensors at practical distances from the terminals.

The invention may include the steps of: (1) determining a temperature at a third location using the third temperature sensor; (2) using at least one second temperature sensor at a second location to determine a temperature difference between the second location and the third location; (3) using a thermal model and the temperature difference to calculate a corrected temperature at the second location; (4) using the corrected temperature at the second location to estimate a cold junction temperature at a terminal for releasably receiving leads of a first temperature sensor; and (5) estimating a first temperature sensor temperature using a first temperature sensor reading and the cold junction temperature estimate.

It is thus a feature of at least one embodiment of the invention to synergistically combine high accuracy and low accuracy cold junction compensation to provide for correction of terminal-to-terminal temperature variations The invention may include a multiplexer circuit having inputs connected to at least two temperature sensors and an output connected to the analog to digital converter.

It is thus a feature of at least one embodiment of the invention to manage the additional I/O burden and power consumption of the precision power reference presented by multiple cold junction compensators.

These particular objects and advantages may apply to only some embodiments falling within the claims and thus do not define the scope of the invention.

DETAILED DESCRIPTION OF THE PREFERRED EMBODIMENT

Figure 1:
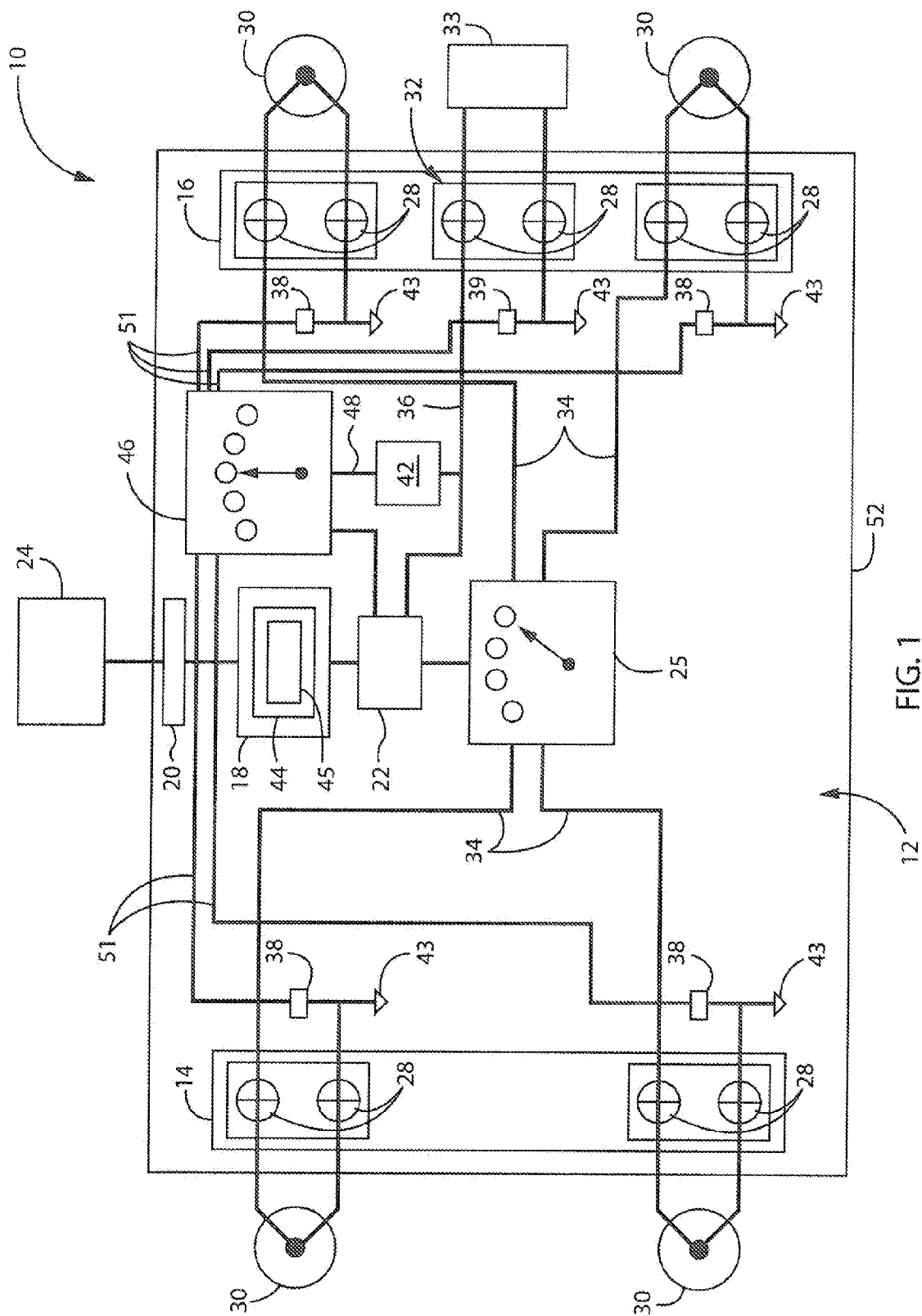
FIG. 1 is a block diagram of an I/O circuit per the present invention showing optional four thermocouples and an optional cold junction compensation device attached to two terminal blocks of the I/O circuit for temperature measurement.

Referring now to FIG. 1, an I/O circuit 10 may provide for processing electronics 12 having connections, for example, to two terminal blocks 14, 16. The terminal blocks 14, 16 have screw terminals 28 or similar design to permit releasable attachment to leads of temperature sensors 30 such as thermocouples, resistance temperature detectors (RTD), thermistors, and solid-state temperature sensors of a type used for sensing temperatures as part of an industrial control process. In addition, the screw terminals 28 may releasably receive a removable cold junction compensation (CJC) temperature sensor, typically a highly accurate resistive temperature device of a type known in the art.

The processing electronics 12 provide a processor 18 such as a microprocessor communicating with a network interface 20 connecting over an industrial control network to other parts of an industrial control system 24 allowing communication between the I/O circuit 10 and the industrial control system 24. The processor 18 may access memory 44 holding stored program 45 for implementation of the present invention, the latter as will be described below. The memory 44 may also hold software for the operation of the I/O circuit 10 according to techniques known in the art (not shown). The processor 18 also communicates with interface circuitry 22 providing analog to digital conversion, amplification and filtering of input signals of a type known in the art. The interface circuitry, in turn, communicates via a first multiplexer portion 46, the latter communicating with a plurality of compensation RTDs 38, and a prime RTD 39 via connections 51 as will be discussed below. As well, the interface circuitry 22 communicates via a second multiplexer portion 25 communicating with a plurality of thermocouples 30 via connections 34

Figure 2:
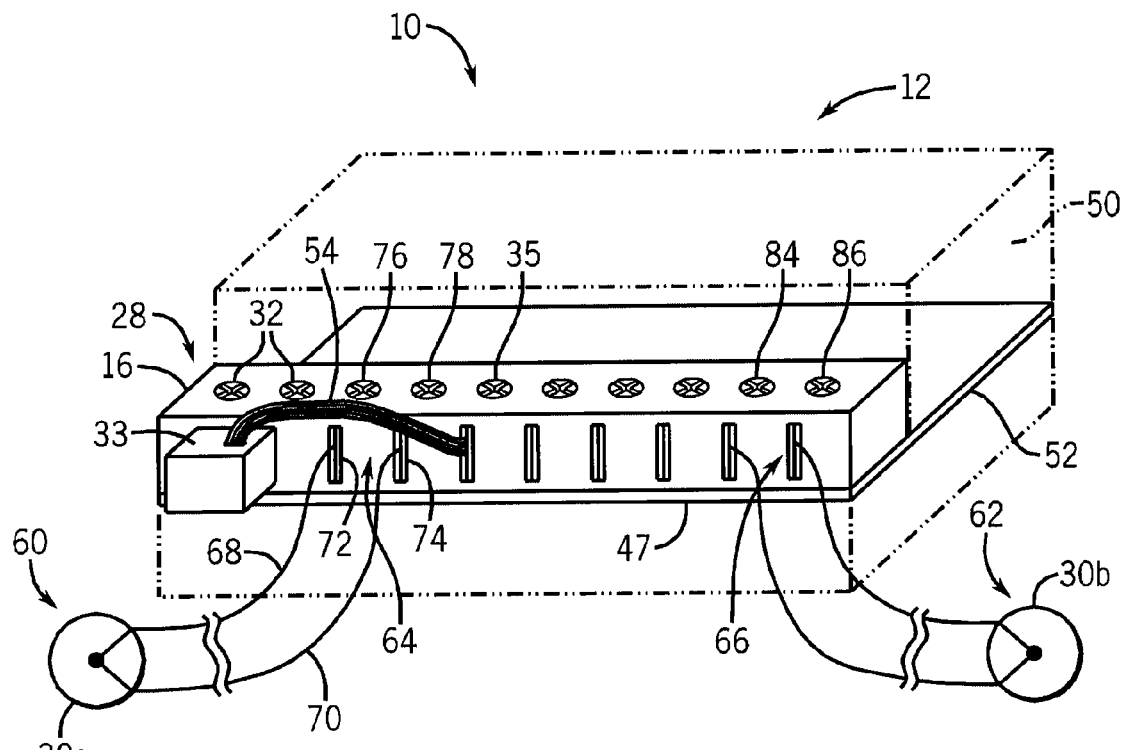
FIG. 2 is a front perspective view of a portion of the I/O circuit of FIG. 1 showing one terminal block and a housing.

Referring now to FIGS. 1 and 2, generally, the processing electronics 12, terminal blocks 14, 16 and other components listed above may be mounted on printed circuit board 52 and interconnected by conductive traces. The printed circuit board 52 may further include connections for power and the like not shown for clarity.

The RTDs 38, 39 may be mounted on the printed circuit board in close thermal proximity with the terminal blocks terminals 28. As noted, the RTDs 38, 39 provide temperature signals via lines 51 to a first multiplexer portion 46 under control of an external signal from the processor 18 as will be described below. The first multiplexer portion 46 is in turn connected to the interface circuitry such as and ADC 22 to provide temperature signals to the processor 18.

Typically, RTDs 38, 39 require a precisely known amount of power from a power supply 42 in order to calculate the resistance of a given RTD, which is used to determine its temperature. The resistance of the RTDs 38, 39 may be converted to a temperature using a linear approximation or by curve fitting to a model of a type known in the art as may be implemented by processor 18. For this reason, the RTDs 38, 39 also receive precision power from power supply 42 over lines 51 from first multiplexer portion 46. The first multiplexer portion 46 receives a power input 48 from power supply 42 and periodically switches this power among connections 51 to RTDs 38, 39 under control of the external signal from the processor 18 also driving the first multiplexer portion 46.

Figure 4:
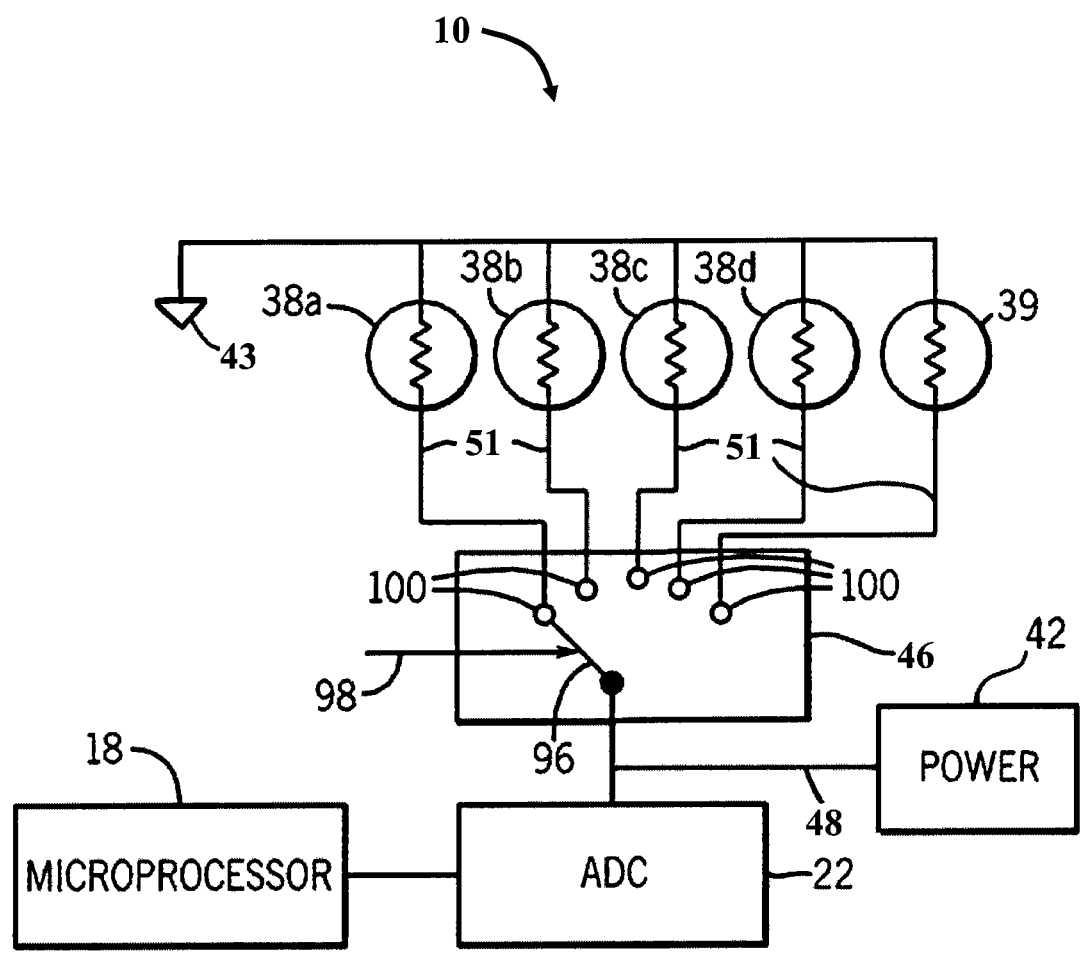
FIG. 4 is a block diagram of a multiplexer of the I/O circuit switching among the cold junction compensation temperature sensors.

Referring now to FIGS. 1 and 4, the RTDs 38, 39 may be supplied with power from power supply 42 by a switching component such as first multiplexer portion 46. The first multiplexer portion 46 may comprise an internal switching element such as solid-state single pole multiple throw switch 96 which may have an external switching control 98 from processor 18. The switching may be done in a round-robin fashion wherein each switch terminal 100 is connected for some predetermined amount of time as controlled by switching control 98 thereby supplying power to each individual RTD 38, 39 for that amount of time. Note that he RTDs' outputs 51 may comprise a pair of differential voltage outputs per RTD wherein the differential voltage is measured by ADC 22 across the RTDs 38, 39 resistive component (not shown).

Similarly, the thermocouple outputs 34 may be connected to a switching component such as second multiplexer portion 25 as shown in FIG. 1 . As with the first multiplexer portion 46, the second multiplexer portion 25 may comprise an internal switching element such as solid-state single pole multiple throw switch which may have an external switching control (not shown). The switching may be done in a round-robin fashion synchronously with the second multiplexer portion 25 wherein each switch terminal is connected for some predetermined amount of time as controlled by switching control 98 thereby supplying the respective RTD signal to the interface circuitry ADC 22 for that amount of time.

As noted, the first multiplexer portion 46 and the second multiplexer portion 25 may be operated in tandem wherein control signals connected to switch controls may be synchronized. In this manner, only a single analog to digital converter is needed within interface circuitry 22 for multiple RTDs. As shown, the switching control signals may be provided by clock circuitry under control of the microprocessor or by some other control apparatus.

Referring now to FIG. 1, in one embodiment, the second multiplexer portion 25 may receive output signals from temperature sensors shown as thermocouples 30 via associated terminals 28 and electrical conductors 34. The thermocouples may have a single lead tied to ground 43 with the other lead 34 connected to the second multiplexer portion 25. Alternatively, the thermocouples' outputs 34 may comprise a pair of differential voltage outputs per thermocouple wherein the differential voltage is measured across the thermocouple 30 leads (not shown). In addition, interface circuitry ADC 22 may receive CJC 33 output 36 as a single lead (i.e. single-ended) or may comprise a pair of differential voltage outputs 36. The first multiplexer portion 46 may, alternatively, also receive signals from RTDs 38, 39 via electrical conductors 51.

It will be understood that in an alternative embodiment electrical conductors 34 and 51 which conduct the thermal signals may interface directly with a multiple input interface circuitry 22 without first multiplexer portion 46, or may interface directly to one or more inputs of processor 18 having the necessary processing circuitry such as an A/D converter.

Referring now to FIG. 2, a housing 50 may support and/or enclose printed circuit board 52 and processing electronics 12 and a portion of terminal block 16. In addition, the housing 50 may generally provide a planar base 47 that may be mounted by means of a DIN rail or the like (not shown) so that the base 47 abuts a vertical planar surface of a similar cabinet structure (not shown) or may provide a module or component fitting within a programmable logic controller or the like.

The terminal block 16 may consist of a linear array of screw terminals that receive electrical conductors such as leads from one or more thermocouples 30a and 30b. As depicted, temperature sensors such as thermocouples 30a, 30b may be connected to terminal block 16 at locations 64 and 66, for example, to measure the temperatures at a remote locations 60 and 62. In this example, thermocouple 30a having leads 68, 70 may be connected to terminal block 16 at terminals 72, 74 by inserting the thermocouple leads 68, 70 into terminals 72, 74 respectively and then tightening screws 76, 78 to ensure the leads 68, 70 are releasably attached. Similarly, for thermocouple 30b, the leads are inserted into the terminals at location 66 and the associated screws are tightened.

The terminal block 16 may have terminals that are configured for receiving CJC 33. The CJC 33 may measure the temperature at the terminals 32 to which it is connected, or may measure the temperature at different terminals such as terminal 35 to which they communicate by means of a temperature conductive pigtail 54 as illustrated in FIG. 2. The location, whether at terminals 32 or 35, may be entered to the processor 18 by an input device (not shown), for example, communicating with the industrial control system 24 (and thus to the processor 18) over the network interface 20, or the information about the terminal 32 of CJC 33 may be preprogrammed or otherwise accounted for by information stored in the processor memory 44.

Figure 3:
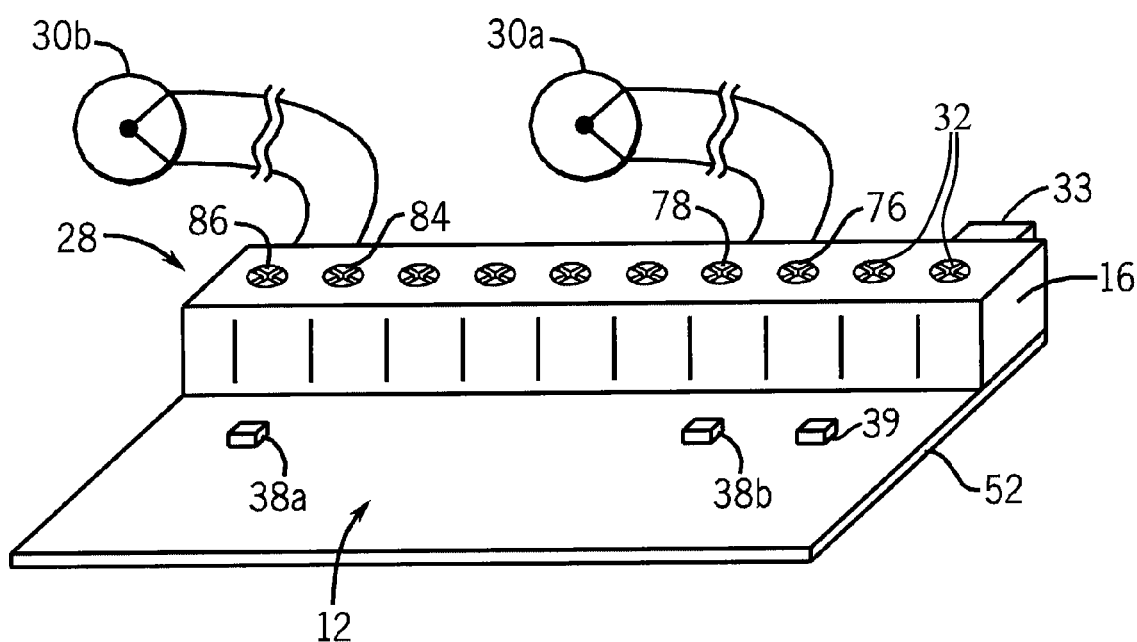
FIG. 3 is a rear perspective view the terminal block of FIG. 2 without the housings showing two cold-junction compensation sensors associated with the terminals holding the thermocouples.

Turning now to FIG. 3 but also referring to FIG. 2, the printed circuit board 52 holding the processing electronics 12 described above may also support one or more compensation RTDs 38a, 38b and prime RTD 39. Compensation RTDs 38b and 38a are in thermal proximity to the thermocouple cold junctions 30a, 30b respectively at locations 64 and 66, while prime RTD 39 is in thermal proximity to CJC 33.

The compensation RTDs 38a, 38b are utilized in the measurement of the temperature of their respective proximal thermocouple cold junctions. For example, compensation RTD 38a may be proximate to screw terminals 86, 84 (of thermocouple 30b) and compensation RTD 38b may be proximate to screw terminals 76, 78 (of thermocouple 30a). Thus, compensation RTD 38a may be used to help determine the temperature of the cold junction for thermocouple 30b and compensation RTD 38b may be used to help determine the temperature of cold junction for thermocouple 30a. In addition, prime RTD 39 may be used to help determine the temperature of both thermocouples 30a, 30b cold junctions as will be explained below.

Figure 5:
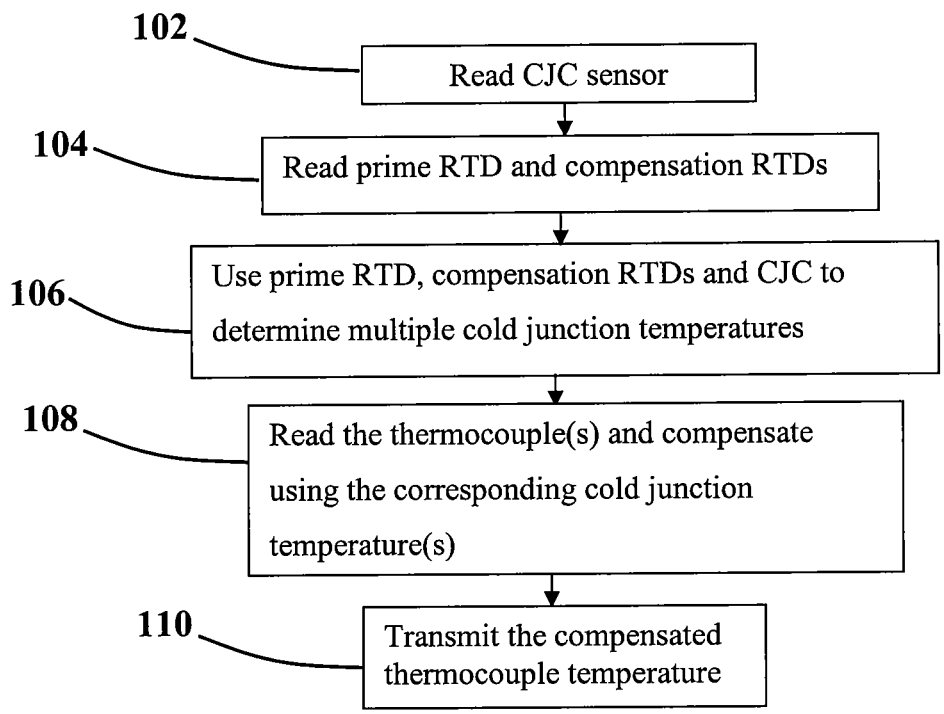
FIG. 5 is a flow chart of a program executed by the present invention within the I/O circuit or elsewhere.

Referring primarily to FIG. 5 but also to FIGS. 1, 3 and 4, a method of determining the temperature of a thermocouple is described. To measure the temperature of a thermocouple, for example 30b, the processor 18 may execute a stored program 45 in memory 44 to read the CJC 33 and determine its cold junction temperature per process block 102.

Next, in process block 104, the compensation RTD 38a for thermocouple 30b is read along with the prime sensor RTD 39 nearby CJC 33. This reading process may include clocking of the first and second multiplexer portion 25, 46 appropriately until all necessary readings have been obtained.

At process block 106 a temperature difference is determined between compensation RTD 38a and prime RTD 39. The temperature difference is used to correct the temperature measured by CJC 33 to yield the estimated cold junction temperature of thermocouple 30b at location 66 (similarly, the temperature difference between compensation RTD 38b and prime RTD 39 is used with CJC 33 to estimate the cold junction temperature of thermocouple 30a at location 64). By measuring the temperature difference between RTDs this eliminates any common temperature offset error between the respective RTDs which may improve accuracy.

However, compensation RTDs 38 and prime RTD 39 may also be calibrated to achieve the measurement accuracy required for a given industrial process. For example, in one embodiment, all of the RTDs 38, 39 may be calibrated by taking at least one calibrating measurement at the factory. Alternatively or in addition, RTDs 38, 39 may also be calibrated after manufacture through the use of the more accurate CJC 33. Either calibration yields a model to map RTD readings to temperatures. For example, the model for a given RTD could comprise a single temperature coefficient to map the measured resistance of the RTDs to a temperature.

At process block 108 the thermocouples are read and their respective cold junction temperatures (determined in block 106) are used to compensate the thermocouple readings to produce an the compensated thermocouple temperature. Finally, the compensated thermocouple temperature signals may be transmitted to the industrial control system 24 for use in controlling equipment or the like at process block 110.

Generally an empirically derived thermal model may be determined by tabulating readings at a variety of different ambient temperatures and in different applications. Multiple temperature measurements may then be averaged or otherwise statistically analyzed to produce model parameters that function to correct the temperature readings or difference temperature estimates of the compensation RTDs and prime RTD. In one embodiment, a simple thermal model such as a multiplicative factor k may be multiplied by the RTD. In another embodiment the thermal model may comprise a multiplicative factor k and an offset C. In either embodiment, the model parameters k and C or other parameters may be unique to a given installation, a given hardware configuration, or may vary with temperature. In yet another embodiment the thermal model may provide a lookup table that may be accessed by some value such as the temperature or reading difference of compensation RTD 38 and a prime RTD 39.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. The terms multiplexer and de-multiplexer are used synonymously, being simply a matter of context.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An I/O circuit for use with an industrial control system comprising:
    a terminal block having at least one first terminal for releasably receiving leads of at least one first temperature sensor;
    a multiplicity of second temperature sensors permanently affixed in thermal communication with each of the at least one first terminals of the terminal block;
    at least one second terminal for connecting at least one third temperature sensor having a higher accuracy than the multiplicity of second temperature sensors; and
    input circuitry electrically connected to each of the at least one first terminals, the second temperature sensors, and each of the at least one second terminals for receiving temperature signals from each of the at least one first temperature sensors, the second temperature sensors, and each of the at least one third temperature sensors, wherein the input circuitry is operable to compensate the temperature signal received from each of the at least one first temperature sensors using temperature signals from the second temperature sensors and from each of the at least one third temperature sensors.

2. The I/O circuit of claim 1 wherein the terminal block is attached to a printed circuit board and the multiplicity of second temperature sensors are soldered to the printed circuit board.

3. The I/O circuit of claim 1 further including a housing covering a portion of the terminal block and wherein the multiplicity of second temperature sensors are covered by at least one of the housing and terminal block.

4. The I/O circuit of claim 1 wherein the multiplicity of second temperature sensors are RTD sensors.

5. The I/O circuit of claim 1 wherein the input circuitry includes a microprocessor executing a stored program to compensate the temperature signal received from each of the at least one first temperature sensors using temperature signals from the second temperature sensors.

6. The I/O circuit of claim 5 wherein the stored program provides communication with an industrial control system executing control instructions to control an industrial process in real-time.

7. The I/O circuit of claim 5 wherein the microprocessor further executes the stored program to use a thermal model and the temperature signals of the second temperature sensors to estimate a cold junction temperature at each of the at least one first terminals.

8. The I/O circuit of claim 1 wherein there is one second compensation temperature sensor for each of the at least one first terminals releasably receiving leads of first temperature sensors.

9. The I/O circuit of claim 8 wherein one of the second temperature sensors is defined as a prime temperature sensor and wherein there is one prime temperature sensor for each third temperature sensor.

10. The I/O circuit of claim 9 further comprising:
    a microprocessor executing a stored program to compensate a first temperature sensor by estimating the temperature of its cold junction at a first location by:
    (1) determining a temperature at a third location using one of the at least one third temperature sensors;
    (2) using one prime temperature sensor and one second compensation temperature sensor to determine a temperature difference;
    (3) using the temperature at the third location and the temperature difference to determine a cold junction temperature at the first location; and
    (4) compensating the thermocouple reading connected to a cold junction at the first location to determine a thermocouple temperature.

11. The I/O circuit of claim 10 wherein determining the temperature difference utilizes a thermal model comprising one selected from a group consisting of a look-up table, and an equation with at least one coefficient.

12. The I/O circuit of claim 1 further comprising a multiplexer circuit having inputs connected to at least two temperature sensors and an output connected to the input circuitry.

13. The I/O circuit of claim 12 further comprising a multiplexer selectively connecting power and input lines to the plurality of second temperature sensors in a predetermined sequence.

14. A method of measuring temperature using an I/O circuit having a terminal block having terminals for releasably receiving leads of first temperature sensors and having a multiplicity of second temperatures sensors permanently affixed in thermal communication with the terminals of the terminal block, the method comprising the steps of:
  receiving temperature signals from the first temperature sensors and second temperature sensors;
  receiving a temperature signal from a third temperature sensor having a higher accuracy than the multiplicity of second temperature sensors; and
  compensating the received temperature signals from the first temperature sensors using temperature signals from the second temperature sensors and the third temperature sensor.

15. The method of claim 14 wherein the terminal block is attached to a printed circuit board and the multiplicity of second temperature sensors are soldered to the printed circuit board and further including a housing covering a portion of the terminal block and wherein the multiplicity of second temperature sensors are covered by at least one of the housing and terminal block.

16. The method of claim 14 wherein the multiplicity of second temperature sensors are RTD sensors and at least one first temperature sensor is a thermocouple.

17. The method of claim 14 having a prime RTD proximate to the third temperature sensor, and compensation RTDs proximate to first temperature sensor terminals further including the step of subtracting prime RTD and compensation RTD readings to determine a difference temperature and using the difference temperature and the third temperature sensor reading to estimate temperature of first temperature sensor terminals proximate to compensation RTD.

18. The method of claim 14 further including the step of sequentially connecting at least two temperature sensors to power such that they are energized for a period of time, and the step of sequentially connecting the at least two temperature sensor outputs to a single digitizing input in communication with a microprocessor.

* * * * *